US008184127B2

(12) United States Patent
Jeong

(10) Patent No.: US 8,184,127 B2
(45) Date of Patent: May 22, 2012

(54) APPARATUS FOR AND METHOD OF GENERATING GRAPHIC DATA, AND INFORMATION RECORDING MEDIUM

(75) Inventor: Young-hoon Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 768 days.

(21) Appl. No.: 11/188,787

(22) Filed: Jul. 26, 2005

(65) Prior Publication Data

US 2006/0050076 A1 Mar. 9, 2006

(30) Foreign Application Priority Data

Sep. 7, 2004 (KR) .................. 10-2004-0071230

(51) Int. Cl.
*G09G 5/00* (2006.01)
(52) U.S. Cl. .......... 345/619; 345/581; 345/58; 345/606; 345/636; 382/190; 382/260
(58) Field of Classification Search .................. None
See application file for complete search history.

(56) References Cited

U.S. PATENT DOCUMENTS

| | | | |
|---|---|---|---|
| 6,421,094 B1 | 7/2002 | Han | |
| 6,538,656 B1 * | 3/2003 | Cheung et al. | 345/519 |
| 6,661,467 B1 * | 12/2003 | Van Der Meer et al. | 348/564 |
| 6,980,220 B1 * | 12/2005 | Politis | 345/592 |
| 7,091,968 B1 * | 8/2006 | Ludvig et al. | 725/39 |
| 7,554,563 B2 | 6/2009 | Jeong | |
| 2002/0047851 A1 * | 4/2002 | Hirase et al. | 345/619 |

FOREIGN PATENT DOCUMENTS

| | | |
|---|---|---|
| AU | 200053605 A1 | 8/2000 |
| EP | 0 634 733 | 7/1994 |
| EP | 1 088 449 | 6/1999 |
| EP | 1 107 224 | 11/2000 |
| EP | 1 631 078 | 8/2005 |

OTHER PUBLICATIONS

Chinese Patent Office Action mailed Sep. 5, 2008 issued with respect to the corresponding Chinese Patent Application MSP0507112.7.
European Search report issued Jun. 25, 2010 corresponds to European Patent Application No. 05255438.3.
Korean Office Action, Decision of Grant, dated Jun. 14, 2011 corresponds to Korean Patent Application No. 10-2004-0071230.

* cited by examiner

*Primary Examiner* — Antonio A Caschera
(74) *Attorney, Agent, or Firm* — Staas & Halsey LLP

(57) ABSTRACT

An apparatus for and method of generating graphic data, and information recording medium storing the same. An apparatus for generating graphic data includes: a line information extractor extracting line information of each line from the graphic data, the graphic data including plural graphic layers; a line data extractor receiving alpha information to be alpha blended with the graphic layers and the graphic data, and extracting line data from the graphic data; and a line information and line data combiner combining the extracted line information and line data.

27 Claims, 12 Drawing Sheets

APPARATUS FOR AND METHOD OF GENERATING GRAPHIC DATA, AND INFORMATION RECORDING MEDIUM

CROSS-REFERENCE TO RELATED APPLICATION

This application claims the benefit of Korean Patent Application No. 2004-0071230, filed on Sep. 7, 2004, in the Korean Intellectual Property Office, the disclosure of which is incorporated herein by reference.

BACKGROUND OF THE INVENTION

1. Field of the Invention

The present invention relates to a video display control field, and more particularly to an apparatus for and a method of generating graphic data, an apparatus for and a method of encoding run-length, and an information recording medium.

2. Description of Related Art

As digital cameras and digital camcorders become more popular, their use is remarkably increasing. Video taken by a device such as a digital camera or a digital camcorder can be displayed on a separate video device, such as a cathode ray tube (CRT), or on a liquid crystal display (LCD) panel of the device, which is also used as an interface. In order to provide video data as well as information on the video data, the video data and On Screen Display (OSD) data, or the video data and graphic data, are combined and then displayed as a user interface that can be manipulated by a user.

OSD is information that a monitor itself displays on its screen without a separate video signal. For example, when a video signal cable is not properly connected, a message such as "check the connection" is displayed, and when various setting operations are performed using a manipulation button on the front of the monitor, the operations are displayed on screen. All of this employs the OSD function. OSD is usually used to manipulate a monitor's screen display settings.

Image formats expressing digital color images include a variety of formats such as "YUV", "YIQ", etc. in addition to a "RGB" format used in a color computer graphic or a color television. The RGB format expresses a color image using three components: R (Red), G (Green), and B (Blue). The YUV format expresses a color image using a luminance component Y, and two color components U and V. The YIQ format is similar to the YUV format.

FIG. 1 is a reference diagram illustrating a conventional OSD/graphic data. FIG. 1 shows an example of a display screen displayed in a system mounted LCD panel mainly in charge of an interface of a digital camera or a digital camcorder in which video data 110 is displayed in a lowest layer, OSD information indicating a playback state 120 and a date 130 is displayed above the video data 110, and a user interface menu 140 comprising graphic data having a plurality of layers is displayed on the middle of the display screen.

If a screen displayed on an LCD panel of a digital camera or a digital camcorder is also transmitted to a CRT, the OSD information indicating the playback state 120 and the date 130 is displayed; however, the user interface menu 140 is not displayed.

Conventionally, the OSD information or graphic data displayed on these display devices is stored in a separate memory, and the stored OSD information and graphic data are read, processed separately, and displayed on each display device. The graphic data may also be composed of a plurality of graphic layers which are all stored separately and are combined to be displayed on a display device.

FIG. 2 is a block diagram illustrating a general bus system including a conventional video display apparatus. Referring to FIG. 2, a bus system includes a microprocessor 210, a bus master 220, a postprocessor 230, a memory 240, a video display controller 250, display devices 260, and a system bus 270.

The microprocessor 210 supports OSD that informs users of system information or video information, generates OSD data and graphic data, and stores them in a memory so as to support an alpha blending function and various graphic layers in order to provide various user interfaces. These functions may be generated in an exclusive hardware such as an OSD generator or 2D accelerator.

The bus master 220, which is a device that may be a master having authority to control the bus system, includes an input unit that receives an input signal from a camera and stores the signal in a system memory.

The memory 240 stores input video data from a camera and layers of graphic data which is combined with the video data and is displayed.

The postprocessor 230 reads data from a certain area of the memory 240 and displays the data on the video display controller 250, which displays data received from the postprocessor 230 on each of the display device 260.

The system bus 270 transmits data between devices connected to the bus system.

When an input YUV signal sampled at a rate of 4:2:2 is received from a camera, the YUV signal is compressed, restored, stored, or transformed by a video processor, and the transformed data or the stored video data is displayed by a video display device. In general, video display devices express colors represented by a color coordinate system having three-dimensional coordinate axes such as R/G/B, Y/Cb/Cr, Y/Pb/Pr, etc. The video display device may be a single display device or a plurality of display devices, and data may be simultaneously displayed on a plurality of video display devices.

For example, when a video display device is composed of a CRT display device requiring standard definition (SD) (720*480 or 720*576) Y/Cb/Cr video received from a camera, and of a display device requiring RGB video having a different resolution, a color converter that converts the video and a zooming converter that converts an input/output resolution are required due to the different color spaces. An alpha blending function is also required to blend the OSD data and graphic layer.

An equation used for alpha blending is described below.

$$Out(x,y)=Img(x,y)*(1-\text{alpha}(x,y))+Grp(x,y)*(\text{alpha}),$$

wherein, Img(x,y) denotes an image input to a video display control apparatus, 1-alpha(x,y) denotes an alpha blending value which is multiplied by the input image, Grp(x,y) denotes graphic data, alpha denotes an alpha blending value which is multiplied by the graphic data, and Out(x,y) denotes an alpha blended display video.

FIG. 3 is a detailed block diagram illustrating the video display apparatus shown in FIG. 2. Referring to FIG. 3, the video display apparatus includes a memory 240, a postprocessor 230, a National Television System Committee (NTSC) encoder 251, an LCD controller 252, a CRT 261, and an LCD 262.

The memory 240 stores video data 241, graphic data 242 and alpha data 243 for the CRT, and graphic data 244 and alpha data 245 for the LCD.

The video data 241 contains an input Y/Cb/Cr signal received from a camera, which is sampled using an interfacing method at a rate of 4:2:2.

The graphic data 242 and alpha data 243 for the CRT indicate graphic data and alpha data which are displayed on the CRT. The size of graphic data and alpha data is 720*480 which is the same as the video data. The graphic data 244 and alpha data 245 for the LCD indicate graphic data and alpha data which are displayed on the LCD. The size of graphic data and alpha data is 480*240. Each graphic data is generally sampled at 4:4:4, and an alpha value is generally expressed as a level of 16 or of 256.

The postprocessor 230 includes a YCbCr2RGB (a YCbCr to RGB converter) 231, a (1-alpha) blender 232, a first alpha blender 233, a second alpha blender 234, a first adder 235, an RGB2YCbCr (an RGB to YCbCr converter) 236, a scalar 237, and a second adder 238.

The YCbCr2RGB 231 converts a YcbCr signal of the video data 241 read from the memory 240 into RGB for alpha blending. The (1-alpha) blender 232 performs alpha blending by multiplying (1-alpha) by the video data converted into a RGB format. The alpha blender 233 performs alpha blending for the graphic data for the CRT by multiplying the alpha data 243 by the graphic data 242 which are read from the memory 240. The alpha blender 234 performs alpha blending for the graphic data for the LCD by multiplying the alpha data 245 by the graphic data 244 which are read from the memory 240. The adder 235 adds the alpha blended video data and the alpha blended graphic data and outputs them to the RGB2YCbCr 236. The RGB2YCbCr 236 converts the received data in a RGB format into an YCbCr format. The scalar 237 changes the resolution of the alpha blended video data to correspond to the size of the LCD. The adder 238 adds the alpha blended video data whose resolution is changed and the alpha blended graphic data and outputs them to the LCD controller 252.

The NTSC encoder 251 outputs data received from the RGB2YCbCr 236 to the CRT 261, and the CRT 261 displays the received data. The LCD controller 252 outputs the data received from the adder 238 to the LCD 262, and the LCD 262 displays the received data.

Meanwhile, as most multimedia devices tend to require a high compressibility and various data transformations, the data bus proportion maintains considerably high. As the portability of multimedia devices increases, the clock signal of a system is decreased by decreasing various methods to reduce operation of the inside of the system and the bus proportion.

However, the bus proportion of a video display control apparatus among a plurality of masters on bus is rather considerably high due to various types of data. A graphic handling is to read each layer from the memory and directly add it in hardware, which also results in increasing the bus proportion.

FIG. 4, parts (A) and (B), is a reference diagram illustrating the graphic layer and the graphic data shown in FIG. 3. Referring to part (A) of FIG. 4, layer 0 and layer 1 having a size of 720*480 are read from a memory and combined in order to generate graphic data for the CRT. Referring to part (B) of FIG. 4, layer 0, layer 1, and layer 2 having a size of 480*240 are read from a memory and are combined in order to generate graphic data for the LCD. As such, the memory contains a plurality of layers required to generate each graphic data, and the postprocessor 230 has to read all the layers in order to generate the graphic data as show in FIG. 3. Accordingly, a bottleneck occurs in a bus system between the memory 240 and the post processor 230.

The above conventional method increases the size of the bus proportion.

BRIEF SUMMARY

An aspect of the present invention provides an apparatus for and a method of generating graphic data, an apparatus for and a method of encoding run-length, and an information recording medium, in which a data transmission reduction is induced to lower the bus data proportion in a video display control system having more than one display device.

According to an aspect of the present invention, there is provided an apparatus for generating graphic data, including: a line information extractor extracting information on each line included in graphic data from the graphic data including more than one graphic layer; a line data extractor receiving alpha information to be alpha blended with the graphic layers and the graphic data, and extracting each line data included in the graphic data; and a line information and line data combiner combining the extracted line information and line data.

The line information may include information on whether an OSD exists, which indicates whether OSD data exists in the line, information on whether a run-length encoding is to be performed, which indicates whether run-length encoding with respect to the line data is performed, information on whether a bitmap is to be used, which indicates whether a bitmap table is used in order to display color information of each pixel of the line, or information on whether the line is the same as an upper line, which indicates whether the line is identical to a previous line.

The apparatus may further include a run-length encoder performing run-length encoding with respect to the line data depending on information on whether the run-length encoding is to be performed.

The line data may include color data indicating color information of the respective pixel data included in the line, alpha information to be alpha blended with respect to the color data, or the mode information that contains information on a display device in which the respective pixel data are displayed.

The run-length encoder may run-length encode a combined value of the alpha information and the mode information, and run-length encode the color data.

According to another aspect of the present invention, there is provided a run-length encoder, including: a first run-length encoder run-length encoding a combination of alpha information to be alpha blended with graphic data in which more than one graphic layer is combined and information on a display device in which the respective pixel data included in the graphic data are displayed; and a second run-length encoder run-length encoding color information on the respective pixel data.

According to still another aspect of the present invention, there is provided a method of generating graphic data, including: extracting information on each line included in graphic data, the graphic data including more than one graphic layer; receiving alpha information to be alpha blended in the graphic layers and the graphic data, and extracting each line data included in the graphic data; and combining the extracted line information and line data.

According to yet another aspect of the present invention, there is provided a method of generating graphic data, including: run-length encoding a combination of alpha information to be alpha blended with graphic data in which more than one graphic layer is combined and information on a display device in which the respective pixel data included in the graphic data are displayed; and run-length encoding color information on the respective pixel data.

According to a further aspect of the present invention, there is provided a Information recording medium, including: storing a graphic/control integrated data which contains graphic data in which more than one graphic layer is combined, alpha information to be alpha blended with graphic data, and information on a display device in which the respective pixel data included in the graphic data are displayed.

The graphic/control integrated data may include a plurality of line data, and the respective line data may include alpha information on the respective pixel data, information on the display device, and color information on the respective pixel data.

The color information may be indicated by an index value of a bitmap table or an actual color value.

The graphic/control integrated data may include line information data containing information on the respective line data.

The line information data may include information on whether an OSD exists, which indicates whether OSD data exists in the respective lines, information on whether run-length encoding is performed, which indicates whether run-length encoding with respect to the respective line data is performed, information on whether a bitmap is used, which indicates whether color information of the pixel data is displayed using a bitmap table, or information on whether the line is the same as an upper line, which indicates whether the line is identical to a previous line.

The combination of the alpha information and the information on a display device may be run-length encoded in the respective line data.

The color information may be run-length encoded in the respective line data.

According to another aspect of the present invention, there is provided a method of generating graphic/control integrated data, including: extracting line information from graphic data of the graphic/control integrated data, the graphic data having plural combined graphic layers; run-length encoding the extracted line data when the extracted line information indicates that run-length encoding is to be performed, the run-length encoding including run-length encoding a combination of alpha information to be blended with the graphic data and display device information regarding a device in which pixel data are to be displayed, and separately run-length encoding color information of the pixel data; and combining the extracted line information and the encoded line data.

According to another aspect of the present invention, there is provided a video display method of a video display apparatus having a plurality of display devices of different formats, including: reading line information of each line of graphic/control integrated data and storing the read line information in a buffer; analyzing the stored line information; reading line data and storing the read line data in the buffer, based on the analyzing; run-length decoding the line data stored in the buffer and combining the decoded line data with video data to yield combined data, based on the analyzing; and converting a color space and a scale of the combined data so that a format of the combined data is compatible with at least one of the different formats.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
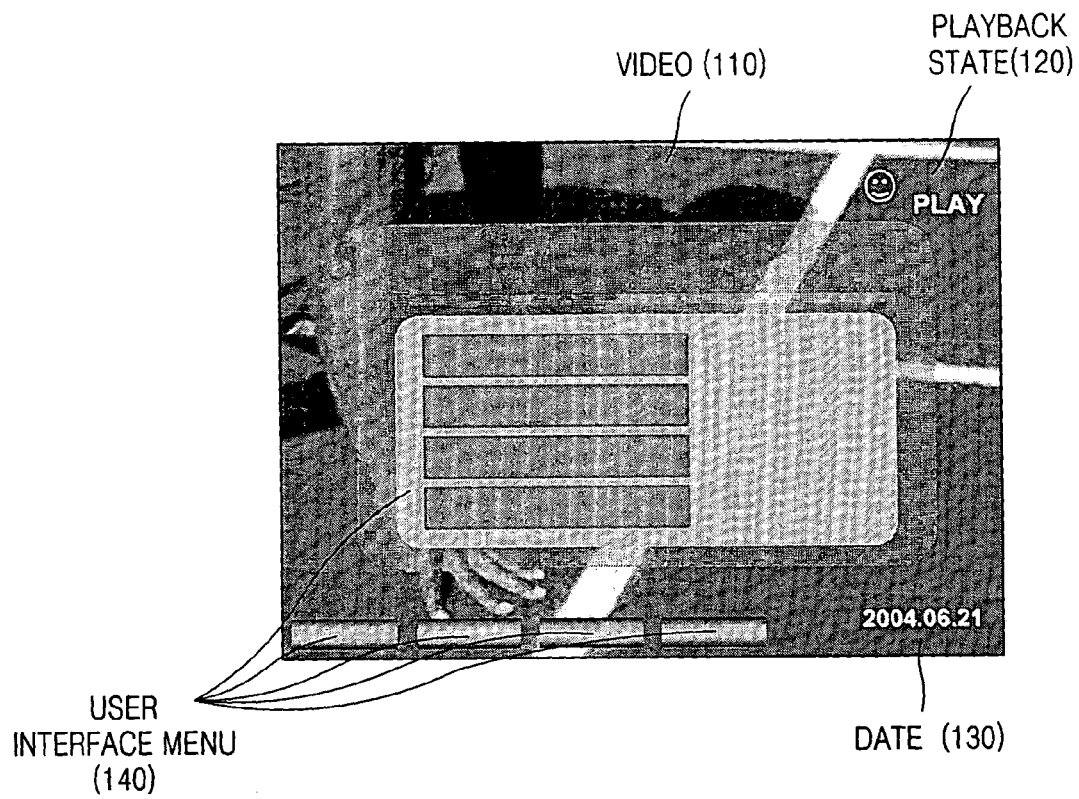
FIG. 1 is a reference diagram describing a conventional OSD/graphic data.
Figure 2:
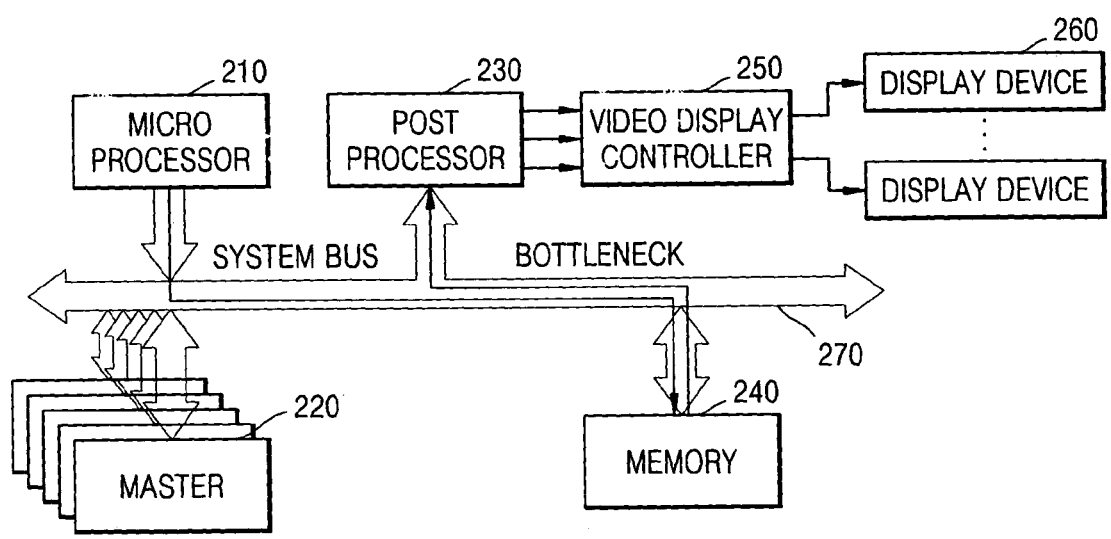
FIG. 2 is a block diagram illustrating a general bus system including a conventional video display apparatus.
Figure 3:
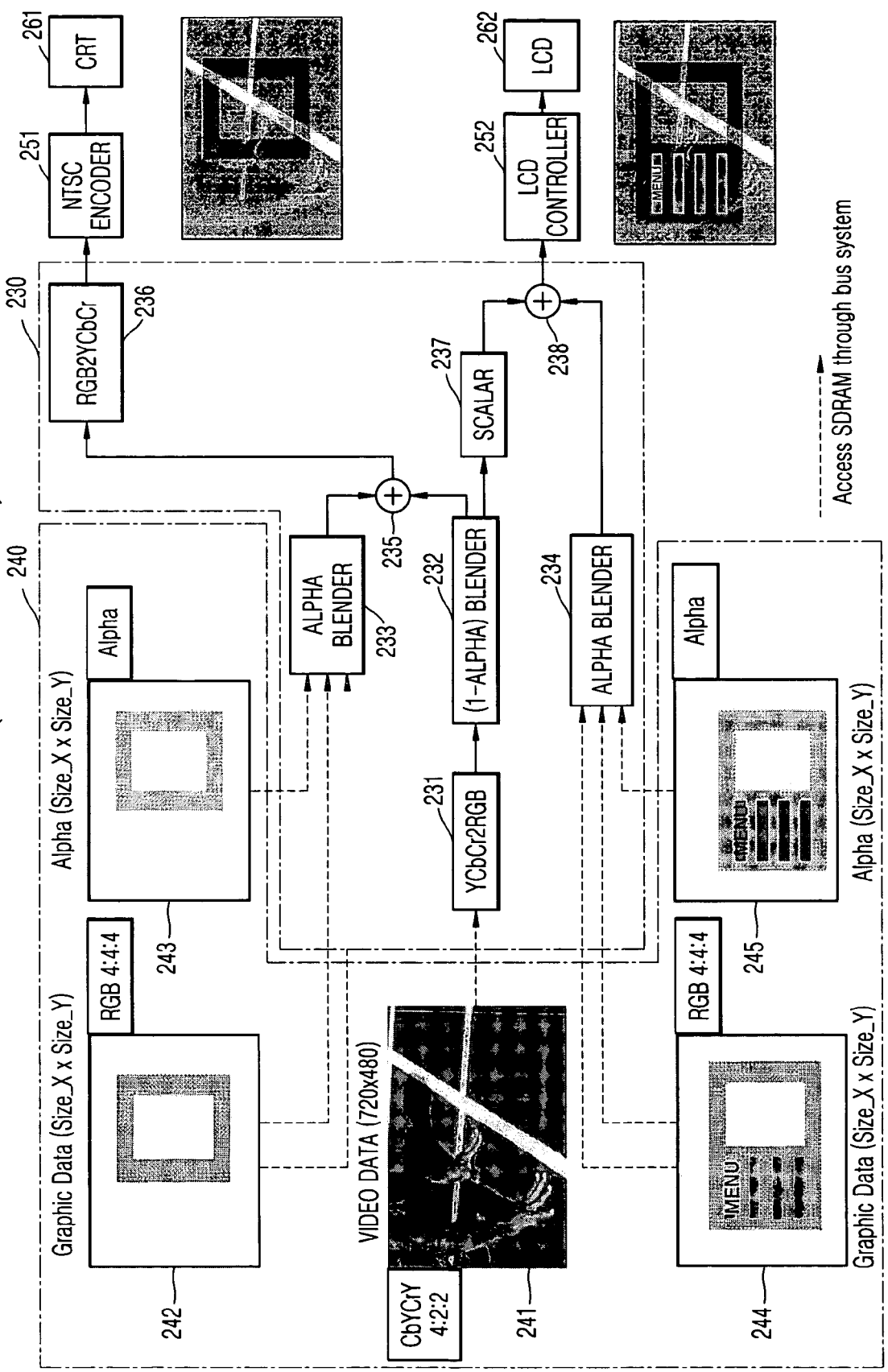
FIG. 3 is a detailed block diagram illustrating a video display apparatus shown in FIG. 2.
Figure 4:
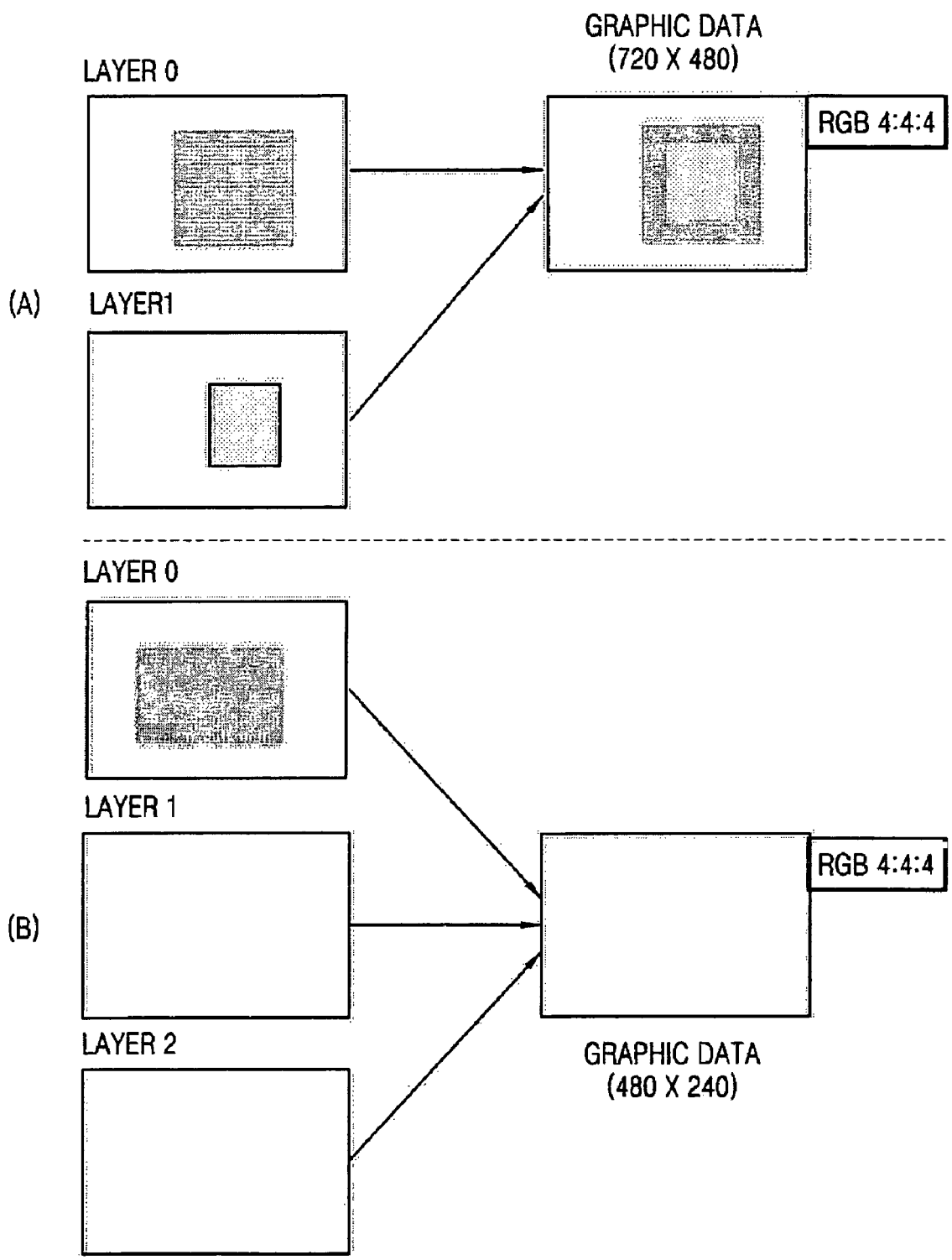
FIG. 4, parts (A) and (B), is a reference view describing a graphic layer and a graphic data shown in FIG. 3.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 5:
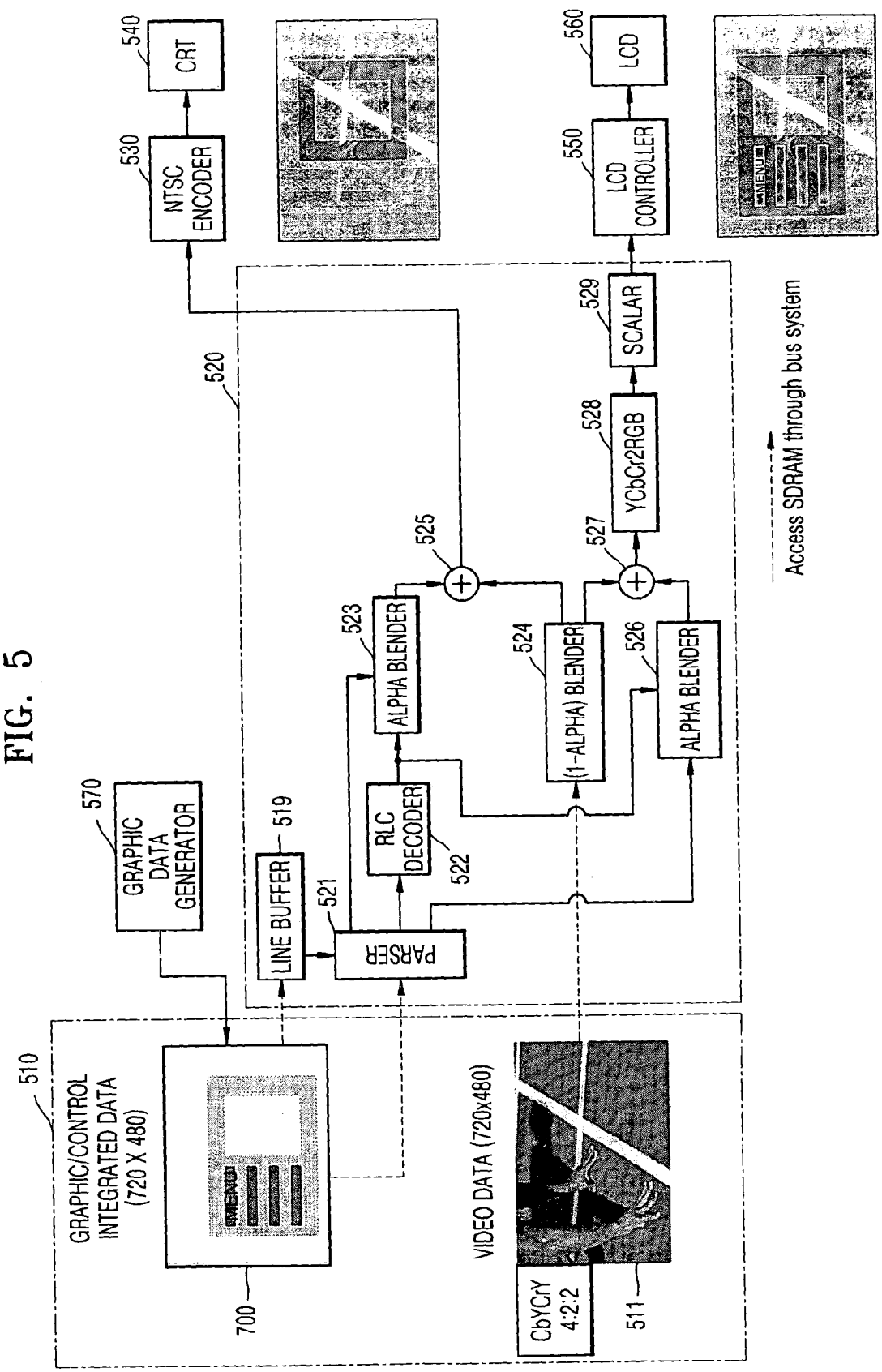
FIG. 5 is a block diagram illustrating a video display apparatus having a plurality of display units according to an embodiment of the present invention.

FIG. 5 is a block diagram illustrating a video display apparatus having a plurality of display devices according to an embodiment of the present invention. Referring to FIG. 5, a video display apparatus includes a memory 510, a postprocessor 520, an NTSC encoder 530, a CRT 540, an LCD controller 550, an LCD 560, and a graphic data generator 570.

In the apparatus shown in FIG. 5, the graphic data generator 570 generates graphic/control integrated data 700 and stores it in the memory 510, and the postprocessor 520 reads the graphic/control integrated data 700 stored in the memory 510, combines it with video data and displays the combined data on the respective display devices.

First, the graphic data generator 570 according to an embodiment of the present invention generates the graphic/control integrated data 700 in which information on OSD data, graphic layers, alpha information, display devices are integrated and stores it in the memory 510. The memory 510 stores the video data 511 and the graphic/control integrated data 700.

The video data 511 is data which is stored by an encoding process from a camera, and has a size of, for example, 720*480.

The graphic/control integrated data 700 integrates graphic layers including final graphic data to be displayed on a display device and includes additional alpha information and information on other display devices. The configuration of the graphic/control integrated data 700 stored in the memory 510 is illustrated in FIG. 7.

Figure 7:
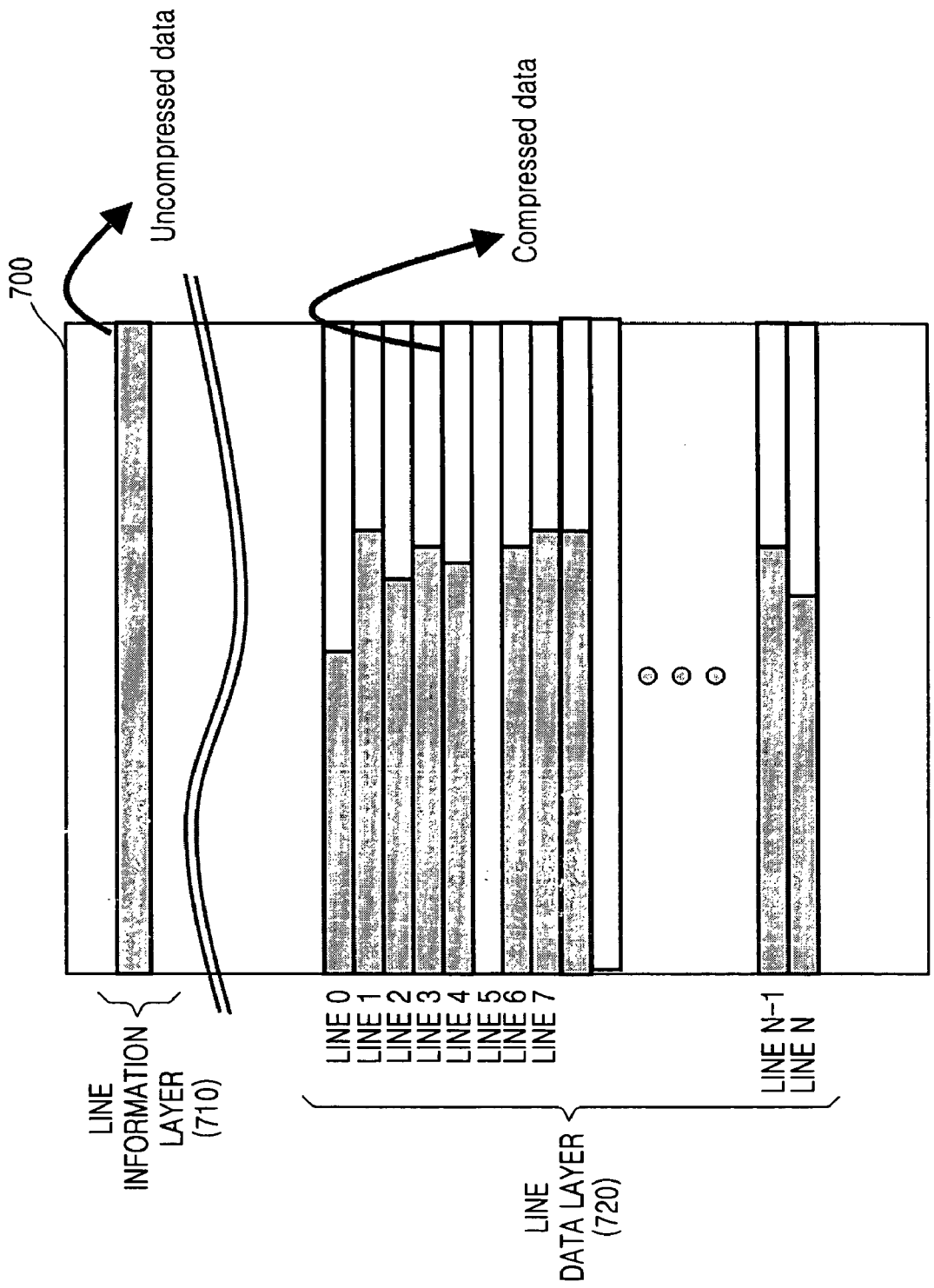
FIG. 7 is a structure chart describing a graphic/control integrated data stored in an external memory shown in FIG. 5.
Figure 8:
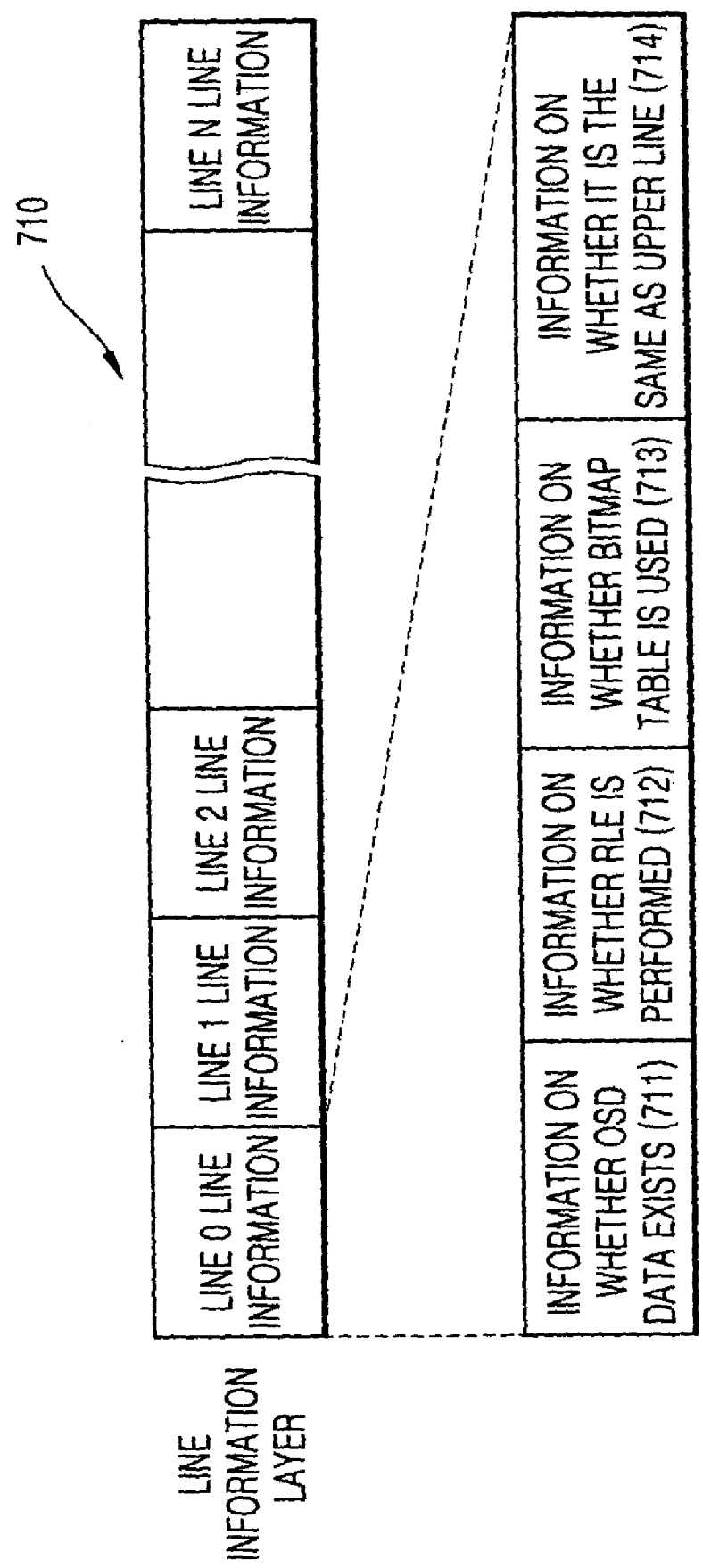
FIG. 8 is a structure chart describing data of a line information layer shown in FIG. 7.
Figure 9:
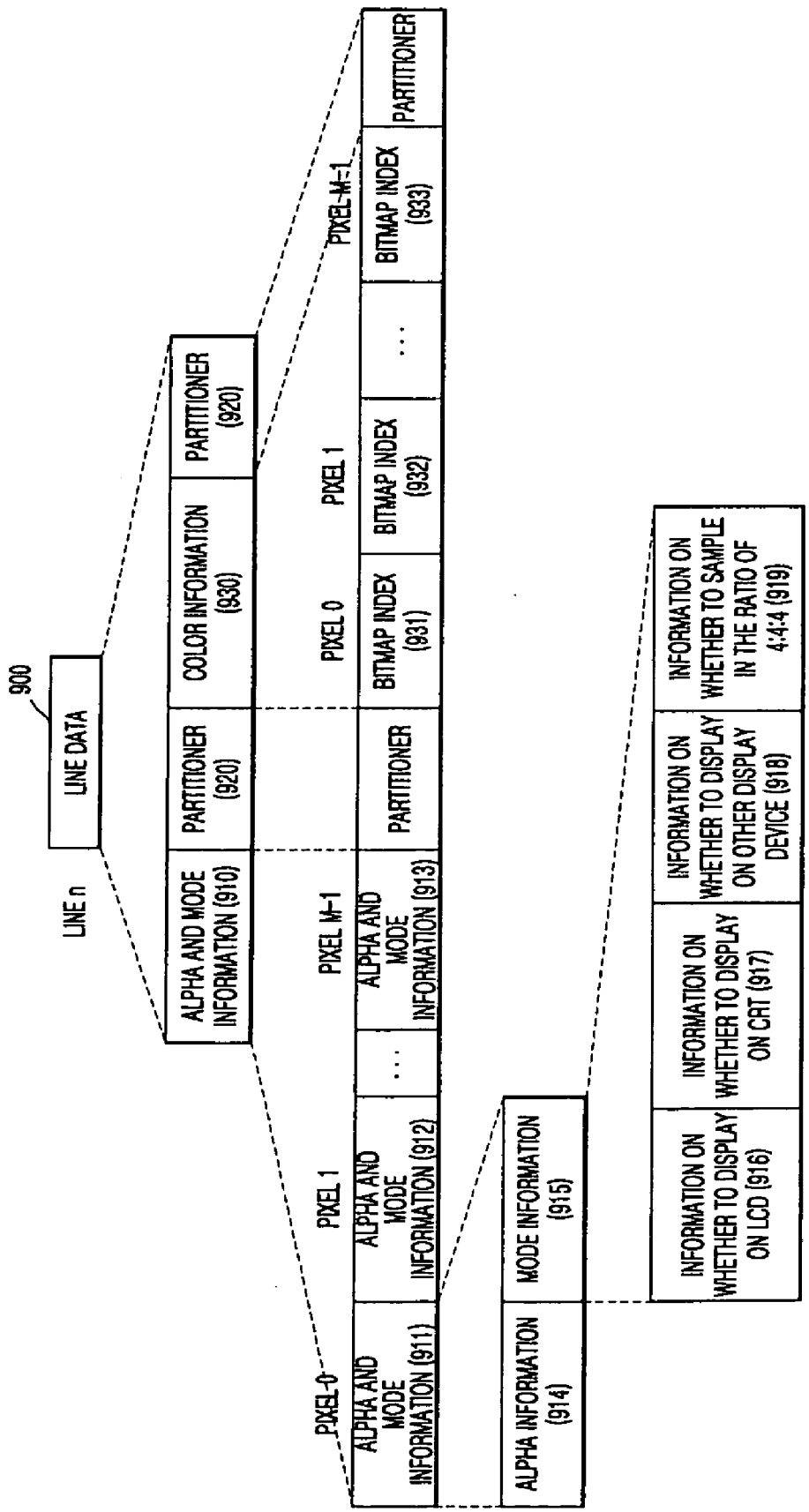
FIG. 9 is an example of a line data of a line data layer shown in FIG. 7.

Referring to FIG. 7, the graphic/control integrated data 700 includes a line information layer 710 and a line data layer 720. The line information layer 710 is uncompressed data, which contains information on each line. The line data layer 720 is pixel data contained in each line, which may be compressed by, by way of a non-limiting example, run-length encoding (RLE). The specific data content of the line information layer 710 is illustrated in FIG. 8, and the specific content of the line data layer 720 is illustrated in FIG. 9. These will be described in detail later.

Figure 6:
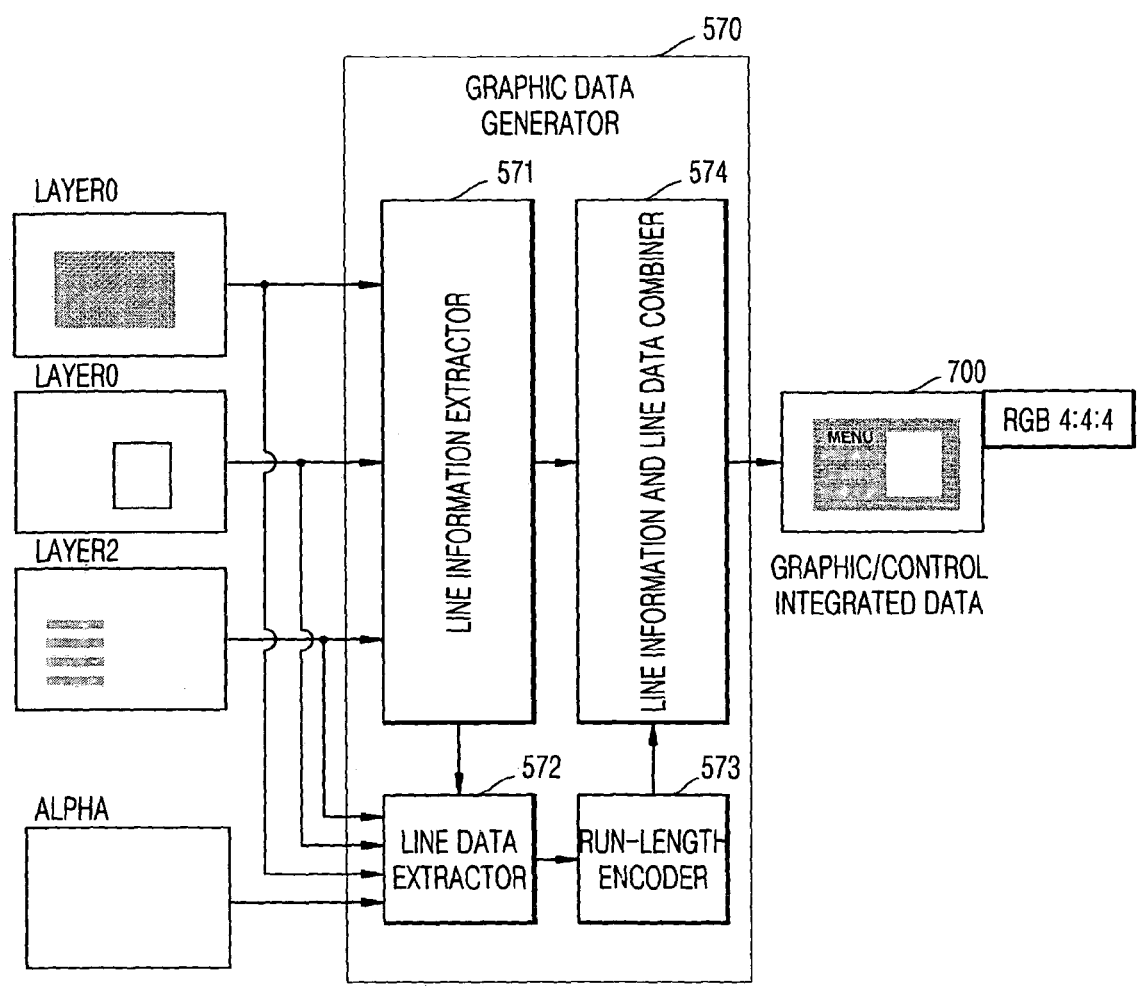
FIG. 6 is a detailed block diagram illustrating a graphic data generator shown in FIG. 5.

The specific configuration of the graphic data generator 570 is illustrated in FIG. 6. Referring to FIG. 6, the graphic data generator 570 includes a line information extractor 571, a line data extractor 572, a run-length encoder 573, and a line information and line data combiner 574. If each constituent of the graphic data generator 570 is made up of by a process using an application program interface (API) through software, various and splendid graphic interfaces which cannot be expressed in a method using an existing OSD chip are expressed. Since every graphic layer and OSD information are formed on a single of layer, a plurality of layers are combined into a single of layer in the existing hardware, which definitely decreases bus proportion. The method of generating data in a process is sufficiently applied under the condition that a frequency of changing a graphic-related video is 3 to 5 frames for a second.

The line information extractor 571 receives input data on every layer, e.g., layer 0, layer 1, and layer 2, to be used for the graphic data, and extracts line information on the graphic data in which all the layers are combined. The combined graphic layers which are composed of pixels horizontally and of lines perpendicularly extract information on each line. For every line from the combined graphic layers, the line information extractor 571 determines whether OSD data exists, whether it is appropriate to perform run-length encoding, whether a bitmap table is used, and whether a line has the same data as that of an upper line, extracts information thereon, and generates the line information layer 710 as shown in FIG. 8.

Referring to FIG. 8, the line information layer 710 has information on each line of data including the combined graphic layers. If the data including the combined graphic layers are composed of n lines, the line information layer 710 has n line information. The respective line information includes information on whether OSD data exists 711, information on whether a RLE is performed 712, information on whether a bitmap table is used 713, and whether it is the same as an upper line 714.

Information on whether OSD data exists 711 is used when OSD data does not exist in a line, and instead of the line being processed a next line is processed. Information on whether run-length encoding is performed 712 is used for performing the run-length encoding when the run-length encoding is more effective as data contained in the line is determined and thus the same data is very redundant. Information on whether a bitmap table is used 713 is whether to regard each pixel data as an index of the bitmap table or whether to use the actual color value as it is. Information on whether it is the same as an upper line 714 is used to employ the previous line data without reading the present line from a memory again in a decoding if the present line is made up of the same data as that of a previous line.

Referring to FIG. 6, the line data extractor 572 receives input data and alpha information on every layer, i.e., layer 0, layer 1, and layer 2, to be used for the graphic data and extracts line data therefrom. The line data includes information on pixels contained in each line. The information on each pixel includes pixel data, i.e., a color value, an alpha value to be applied to the pixel, and information on which display device the pixel data is displayed. Since the OSD data and graphic layer data are integrated for use according to an embodiment of the present invention, with respect to each pixel, there is information indicating to which display device the pixel data is transmitted. For example, the playback state, data, and user interface menu of the graphic data are all displayed on an LCD; however, the OSD information indicating the playback state and data is just displayed on the CRT. Accordingly, each pixel includes information on a display device to which the pixel is transmitted so that the data indicating the playback state and the data is displayed on both a CRT and an LCD, and the user interface menu is displayed on the LCD only.

An example of line data 900 generated by the line data extractor 572 is illustrated in FIG. 9. Referring to FIG. 9, the line data 900 includes alpha and mode information 910, a partitioner 920, color information 930, and another partitioner 920.

The alpha and mode information 910 includes information on an alpha value which is applied to each pixel, and on a display device on which each pixel is displayed. The partitioner 920 is an identifier to identify the alpha and mode information 910 and the color information 930. The color information 930 which is information to express the color of each pixel, is comprised of a luminance signal and a color difference signal.

Each of the pixels has the alpha and mode information, and color information. Referring to FIG. 9, the alpha and mode information 910 contains alpha and mode information 911 on pixel 0, alpha and mode information 912 on pixel 1, ..., and alpha and mode information 913 on pixel M−1. If a bitmap table holds color information of each pixel, the color information 930 contains a bitmap index 931 on pixel 0, a bitmap index 932 on pixel 1, ..., and a bitmap index 933 for pixel M−1.

The alpha and mode information on each of the pixels contains alpha information 914 and mode information 915.

The alpha information 914 indicates an alpha value for adjusting the transparency of a pixel, and the mode information 915 contains information on a display device on which the pixel is displayed and information on whether the pixel is sampled at a rate of 4:4:4.

Referring to FIG. 9, the mode information 915 contains information on whether a pixel is displayed on an LCD 916, information on whether a pixel is displayed on a CRT 917, information on whether a pixel is displayed on other devices, and information on whether a pixel is sampled at the rate of 4:4:4 919. As in the system shown in FIG. 5, the same data is not always displayed on more than two display devices such as the CRT 540 and the LCD 560. For example, with respect to a display device including a touch screen or scroll bar, the display device has to include information for a menu and button, etc., which are not indispensable for other display devices. Hence, graphic/control integrated data included in a memory contains information considering every condition. However, it is required to determine whether a pixel is displayed on every display device. Information on a display device is included in the mode information, which is merely an example. If other display devices are employed, the corresponding information has to be included in the mode information.

Whether a pixel is sampled at the rate of 4:4:4 919 intends to handle a 4:4:4 sampling in an alpha blending considering that as an alpha blending operation is handled using quantized pixel information, an image quality is reduced in a system which is expressed as 4:2:2 as shown in FIG. 5.

The run-length encoder 573 receives output line data from the line data extractor 572 and performs run-length encoding (RLE) on every line. With regard to a line whose run-length encoding is determined not to be performed in the line information extractor 571, run-length encoding is not performed on the line according to the information and the line is displayed on the line information and line data combiner 574.

An example where a run-length is encoded by the run-length encoder 573 is described.

Figure 10:
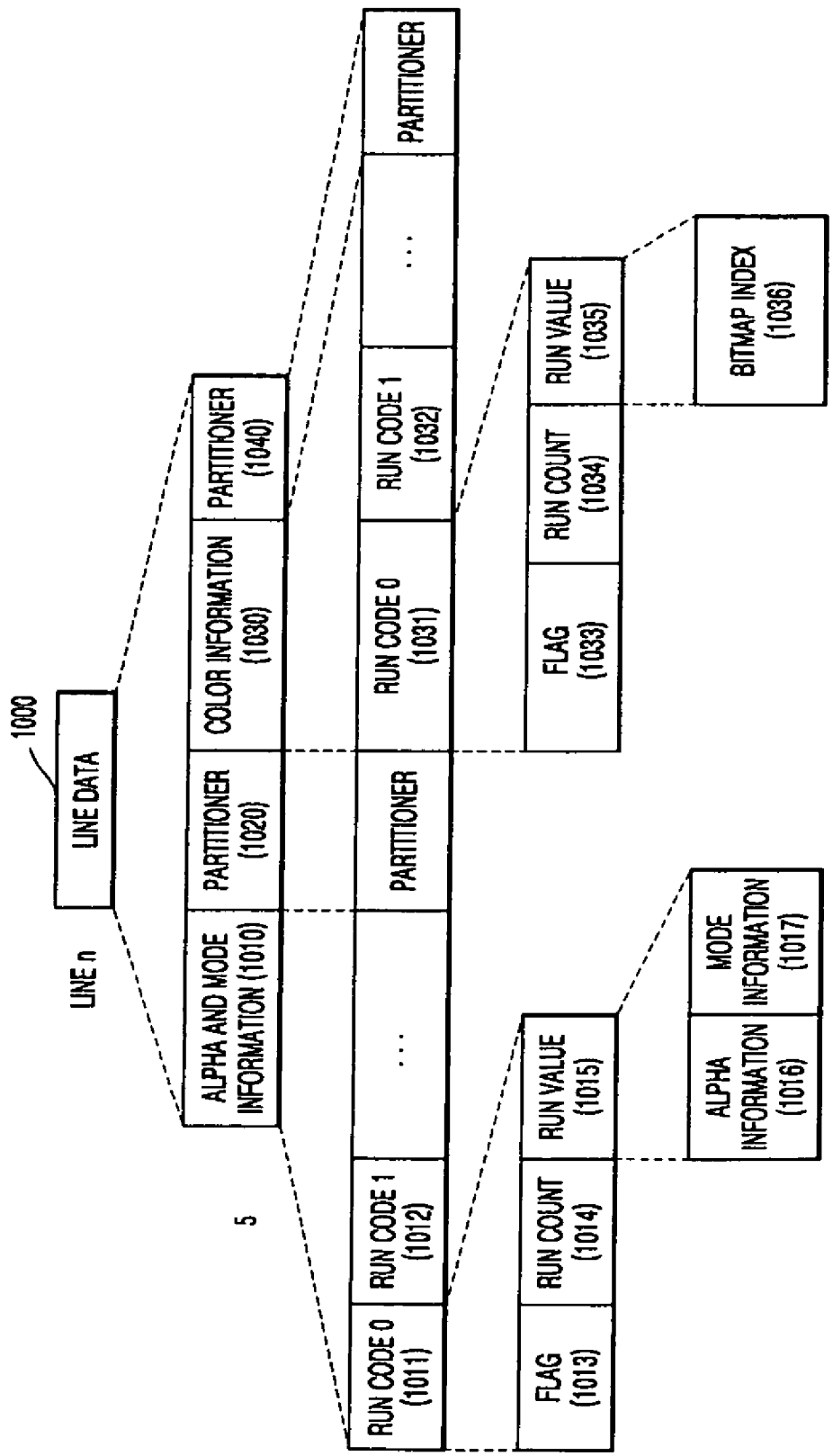
FIG. 10 is another example of a line data of a line data layer shown in FIG. 7.

Referring to FIG. 10, line data 1000 includes alpha and mode information 1010, a partitioner 1020, color information 1030, and another partitioner 1040.

The alpha and mode information 1010 contains run code 0 1011, run code 1 1012, . . . which are run-length encoded. Each run code contains a flag 1013 indicating a run code, a run count 1014 indicating a run length, and a run value 1015. The run value 1015 contains alpha information 1016 and mode information 1017.

The color information 1030 contains run code 0 1031 and run code 1 1032, etc.

Each run code contains a flag 1033 indicating a run code, a run count 1034, and a run value 1035. The run value 1035 indicates a bitmap index 1036. In line data run-length encoding according to an embodiment of the present invention, the alpha and mode information and color information are run-length encoded separately, and are partitioned by a partitioner.

Figure 11:
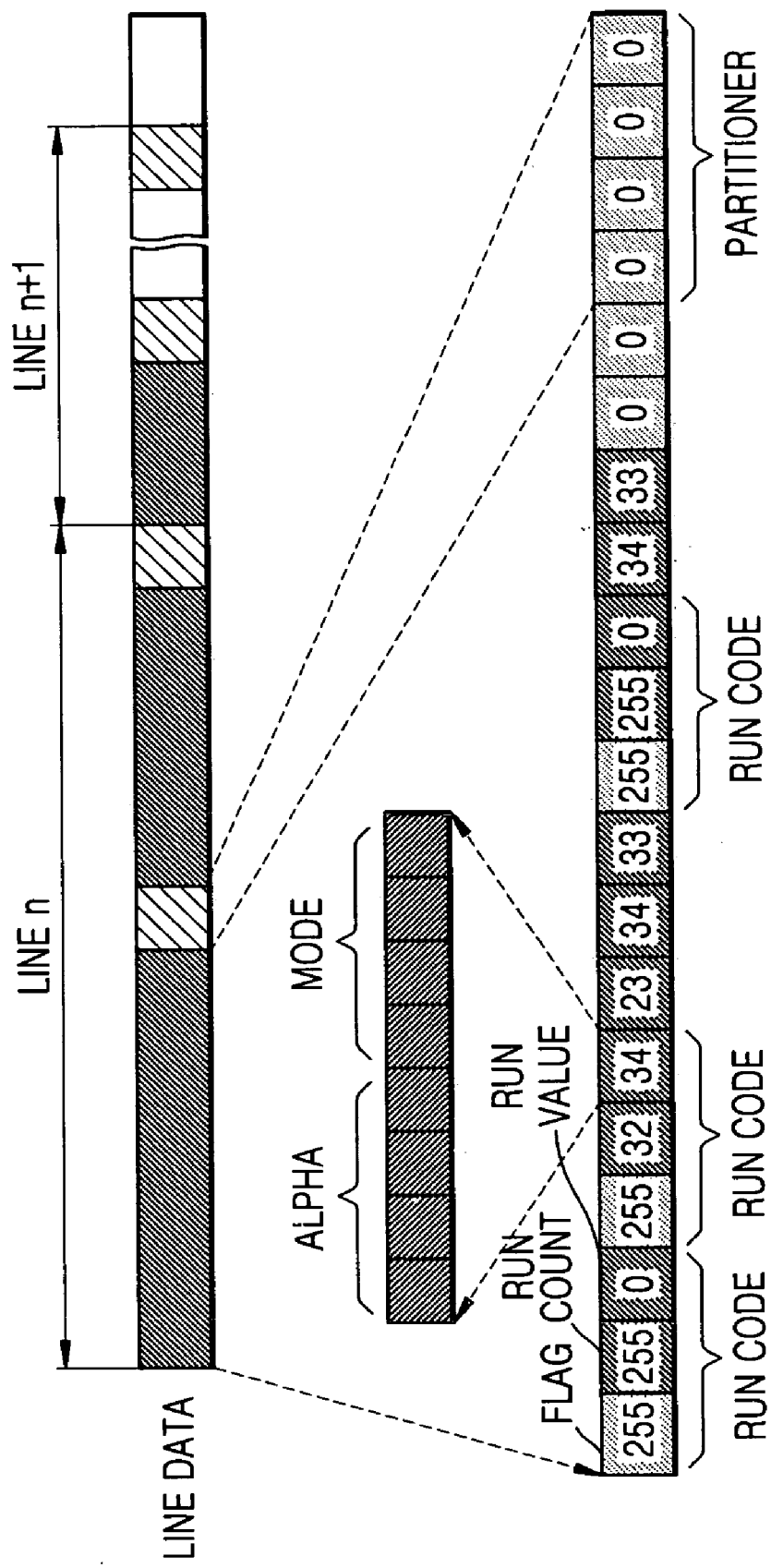
FIG. 11 is a specific example of a line data where a run-length is encoded shown in FIG. 10.

A specific example of line data in which a run-length is encoded is illustrated in FIG. 11.

Referring to FIG. 11, each flag of run codes are expressed as 255 in an example of alpha and mode information in which the run-length is encoded. A first run code indicates consecutive runs of 255 each having a run value of 0, and a second run code indicates consecutive runs of 32 each having a run value of 34.

Since 23, 34, 33 after the second run code has no flag of 255, they indicate the alpha information and mode information with respect to an individual pixel. A next run code indicates consecutive runs of 255 each having a run value of 0. Since 34, 33 after the run code has no flag of 255, they indicate the alpha information and mode information with respect to an individual pixel. In the last six 0s, two 0s are to comply with a unit of 32-bit, and other four 0s are partitioners to partition the alpha and mode information and color information.

Referring to FIG. 5, the postprocessor 520 includes a line buffer 519, a parser 521, a run-length decoder 522, an alpha blender 523, a (1-alpha) blender 524, an adder 525, an alpha blender 526, an adder 527, an YCbCr2RGB 528, and a scalar 529.

The line buffer 519 reads the graphic/control integrated data 700 stored in the memory 510 line by line and stores it. First, the line buffer 519 receives the line information of the graphic/control integrated data 700.

The parser 521 reads data stored in the line buffer 519 and separates input data by lines which are run-length encoded into their characteristics. First, the parser 521 reads line information stored in the line buffer 519 and analyzes it. As described referring to FIG. 8, line information includes the information on whether OSD data exists 711, whether a RLE is performed 712, the information on whether a bitmap table is used 713, and the information on whether it is the same as an upper line 714.

The parser 521 first analyzes the information on whether the OSD data exists 711 in the line information, if the OSD data exists, controls to read line data corresponding to the line information and store it in the line buffer 519, if the OSD data does not exist, analyzes next line information since there is no need to read the line data. The information on whether the OSD data exists makes it possible to remove transmission of line which has no data for transmission, thereby lowering the bus proportion.

The parser 521 analyzes the information on whether a RLE is performed 712, if a run-length encoding is performed, controls line data stored in the line buffer 519 to be decoded by the run-length decoder 522, and if a run-length encoding is not performed, directly extracts detailed data, i.e., alpha information, mode information, and color information included in the line data and transmits it to an alpha blender.

The parser 521 analyzes the information on whether a bitmap table is used 713, if the bitmap is used, controls to find an index of a bitmap table (not shown) and get a color value corresponding to the index to be alpha blended in analyzing the color information of line data.

The parser 521 analyzes whether it is the same as an upper line 714, if the present line has the same data as that of an upper line (i.e., the line just previously decoded), and does not read line data from a memory but uses the present line data stored in the line buffer 519. If the present line is determined to be identical to the upper line owing to the information, the parser uses data included in the line buffer as it is without reading line data from the memory, thereby lowering the bus proportion. If they are not identical to each other, next line data is read from the graphic/control integrated data 700 stored in the memory and is stored in the line buffer 519.

The run-length decoder 522 simultaneously decodes every stream separated from the parser 521 and extracts or calculates alpha information, mode information, and color information. As described referring to FIG. 9, the mode information includes information on a display device on which a pixel is displayed. Based on the information on a display device included in the mode information, an alpha value and color value are displayed on an alpha blender 523 or an alpha blender 526. The alpha blender 523 is for a display on the CRT, and the alpha blender 526 is for a display on the LCD. The mode information may include information on whether a pixel is to sample at the rate of 4:4:4. In a case where information on whether a pixel is to be sampled at the rate of 4:4:4 is set to use a 4:4:4 sampling, an alpha blender is controlled to perform alpha blending using the 4:4:4 sampling, thereby preventing an image quality from being decreased.

The alpha blender 523 performs alpha blending by multiplying an alpha value and color value which are received from the run-length decoder 522.

The (1-alpha) blender 524 receives input video data which are read from the memory 510 and multiplies (1-alpha) the video data by and performs alpha blending.

The adder 525 adds graphic data received from the alpha blender 523 and alpha blended and video data received from the (1-alpha) blender 524 and alpha blended and outputs it to the NTSC encoder 530.

The alpha blender 526 performs the alpha blending by multiplying an alpha value and color value which are received from the run-length decoder 522.

The adder 527 adds graphic data received from the alpha blender 526 and alpha blended and video data received from the (1-alpha) blender 524 and alpha blended and outputs it to the YCbCr2RGB 528.

The YCbCr2RGB 528 converts a YCbCr format received from the adder 527 into a RGB format and outputs it to the scalar 529.

The scalar 529 changes resolution of data received from the YCbCr2RGB 528 to correspond to the LCD display device, and outputs the converted data to the LCD controller 550.

The NTSC encoder 530 outputs data received from the adder 525 to the CRT 540, and the CRT 540 displays the received data. The LCD controller 550 outputs the data received from the scalar 529 to the LCD 560, and the LCD 560 displays the received data.

Figure 12:
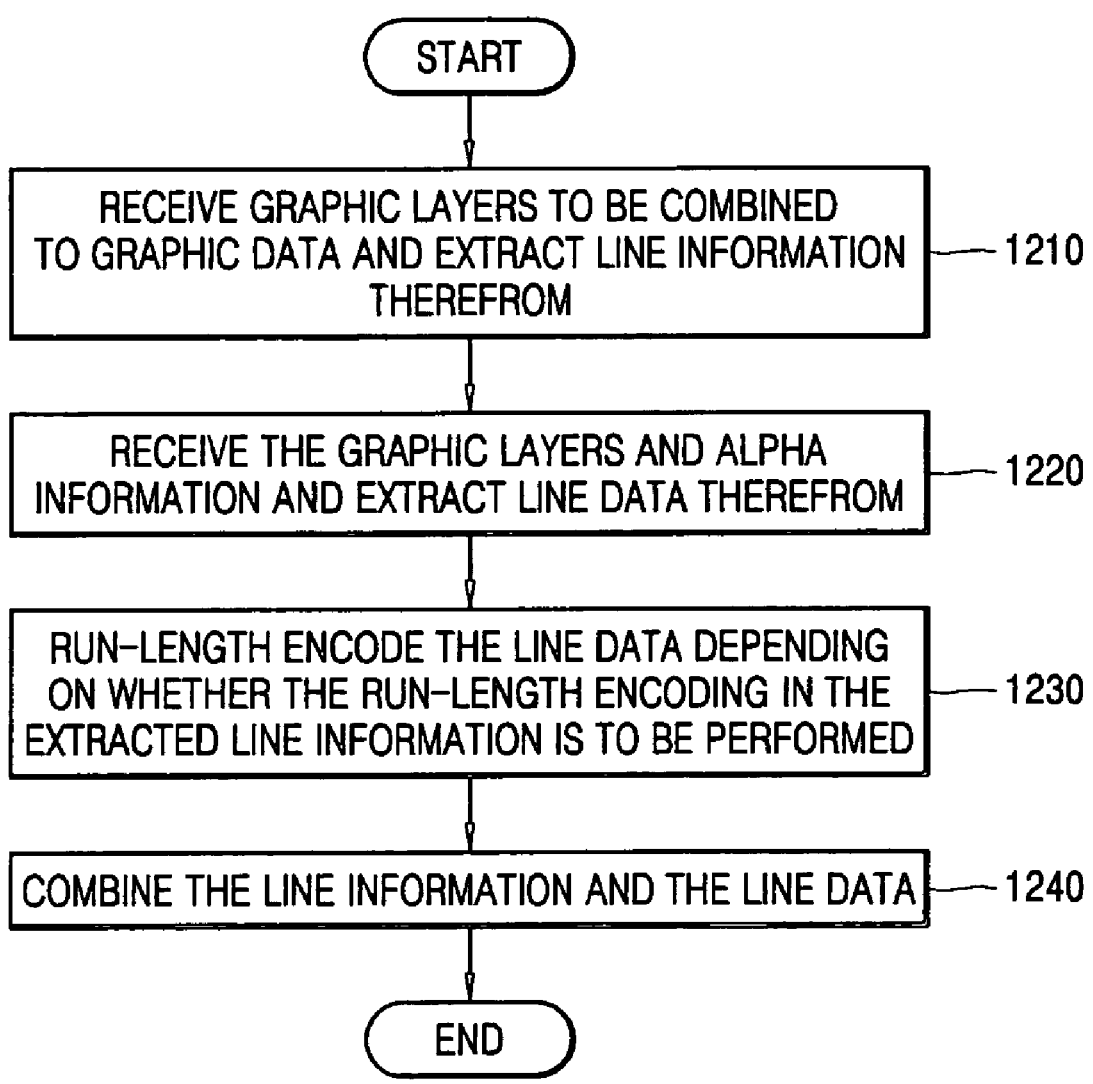
FIG. 12 is a flowchart describing process of generating a graphic/control integrated data in a graphic data generator according to an embodiment of the present invention.

FIG. 12 is a flowchart describing a process of generating graphic/control integrated data according to an embodiment of the present invention. The process may be performed by the graphic data generator of FIG. 5 and is, for ease of explanation only, described in conjunction with that figure. However, it is to be understood that the process can be performed by generators of other configurations and vice versa.

Referring to FIGS. 5 and 12, a line information extractor 571 receives graphic layers to be combined with graphic data and extracts line information therefrom in Operation 1210. As described above, the line information includes at least one of information on whether an OSD exists, which indicates whether OSD data exists in the respective lines, information on whether run-length encoding is performed, which indicates whether a run-length with respect to the respective lines is encoded, information on whether a bitmap is used, which indicates whether color information of the pixel data is displayed using a bitmap table, and information on whether a line is the same as an upper line, which indicates whether the line data is identical to previous line data.

The line data extractor 572 receives the graphic layers and alpha information and extracts line data therefrom in Operation 1220. The line data includes at least one of mode information, which contains color data indicating color information of the respective pixel data included in the line, alpha information to be alpha blended with respect to the color data, and information on a display device in which the respective pixel data are displayed.

The run-length encoder 573 run-length encodes the line data depending on whether the run-length encoding in the line information extracted from the line information extractor 571 is performed in Operation 1230. In a case where information on whether the run-length encoding is performed, the run-length encoder 573, indicates that run-length encoding with respect to a line is appropriate, run-length encodes a combination of the alpha information and information on a display device in which the respective pixel data are displayed, and separately run-length encodes color information of the respective pixel data.

A line information and line data combiner 574 combines the line information and the line data in Operation 1240. If the line data is run-length encoded, the line information and line data combiner 574 combines the line information and the run-length encoded line data.

Figure 13:
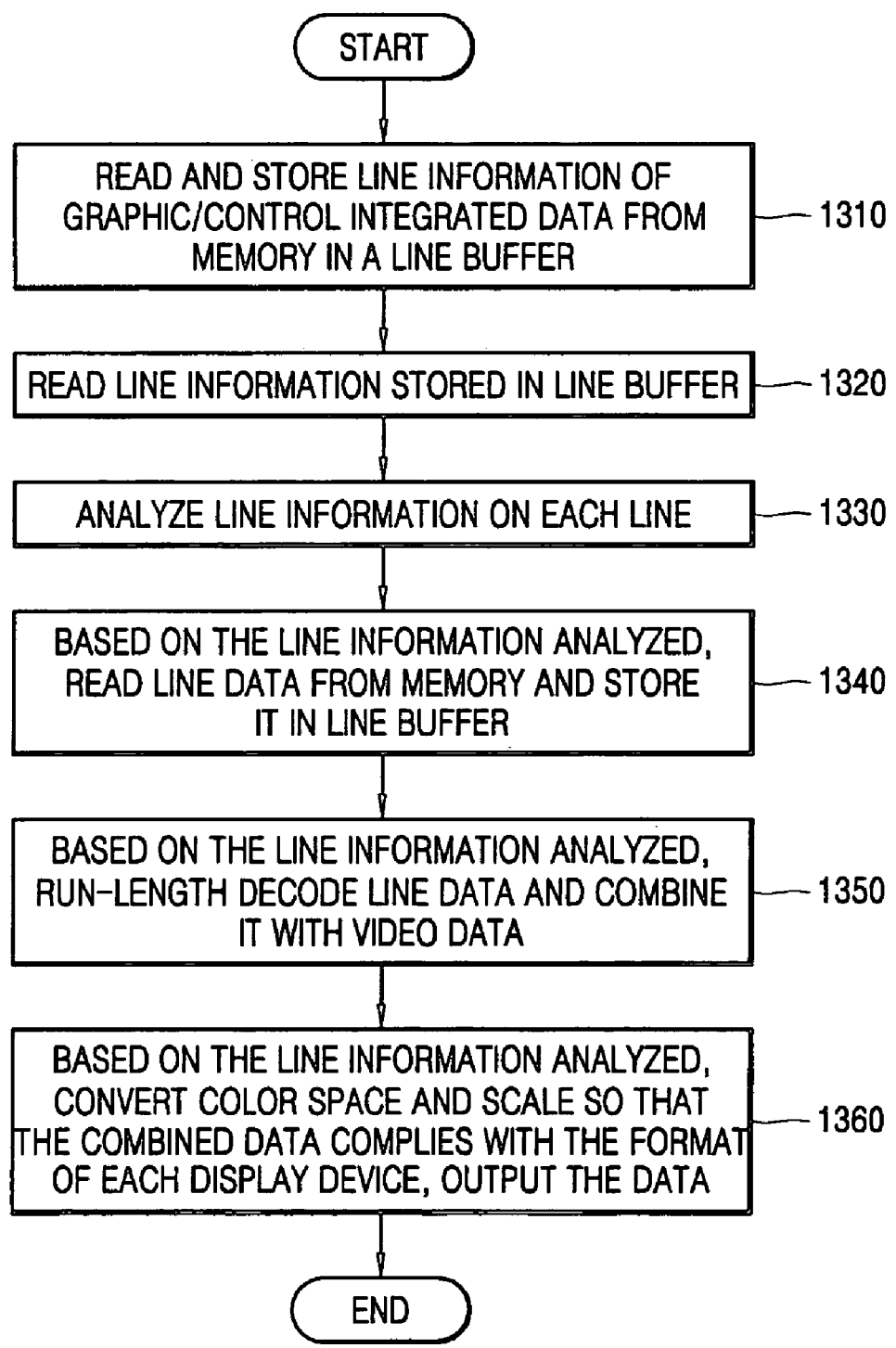
FIG. 13 is a flowchart describing process of a video display method in a video display apparatus having a plurality of display devices according to one embodiment of the present invention.

FIG. 13 is a flowchart describing a video display method used in a video display apparatus having a plurality of display devices according to an embodiment of the present invention.

Referring to FIG. 13, the line information of graphic/control integrated data is read from a memory and is stored in a line buffer in Operation 1310.

A parser reads the line information stored in the line buffer in Operation 1320.

The parser analyzes line information on each line in Operation 1330.

Based on the line information analyzed by the parser, line data is read from the memory and is stored in the line buffer in Operation 1340.

Based on the line information analyzed by the parser, the line data is run-length decoded and is combined with video data in Operation 1350.

Based on the line information analyzed, color space is converted and scale is converted so that the combined data complies with the format of each display device and is displayed in Operation 1360.

The above-described embodiments of the present invention can be realized on a computer-readable recording medium as a computer-readable code. Computer-readable recording media include every kind of recording device that stores computer system-readable data. ROM, RAM, CD-ROM, magnetic tape, floppy disc, optical data storage, etc. are used as a computer-readable recording medium. A computer-readable recording medium is dispersed as a network-connecting computer system, resulting in computer-readable code being stored and executed in a dispersion method.

According to the above-described embodiments of the present invention, data for a video display controller has a better portion of a general multimedia device compared to other modules, and a variety of effects which support a variety of user environments are increased.

Accordingly, as described above, the transmission capacity of a video data, an OSD data, and a graphic data for a variety of display devices is reduced, thereby lowering the bus proportion. As a whole, the power consumption required by systems is reduced, thereby realizing to be suitable for a mobile device.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus including at least one processing device for generating graphic data with plural graphic layers, comprising:
    a line information extractor, using the at least one processing device, extracting line information comprising control information on each line of a plurality of lines of a combined graphic layer constituting the graphic data, generated by combining plural graphic layers into the combined graphic layer;
    a line data extractor receiving all of the layers to be combined to generate the graphic data and input alpha information to be alpha blended with the layers and graphic data, and extracting line data for the graphic data from the received input alpha information and all of the layers, the line data comprising pixel data included in each line of the plurality of lines of the combined graphic layer constituting the graphic data; and
    a line information and line data combiner to generate the graphic data by combining the extracted line information, comprising the control information on each line of the plurality of lines, and the extracted line data, comprising the pixel data included in each line of the plurality of lines and separate respective information for each of select pixel data, of pixel data included in the plurality of lines, indicating a display device, of plural display devices, on which each of the select pixel data is configured to be displayed.

2. The apparatus of claim 1, wherein the line information includes: information on whether an OSD exists, which indicates whether OSD data exists in a respective line; information on whether a run-length encoding is to be performed, which indicates whether run-length encoding with respect to the line data is to be performed; information on whether a bitmap is used, which indicates whether a bitmap table is to be used in order to display color information of each pixel of the respective line; or information on whether the respective line is the same as an upper line, which indicates whether the respective line is identical to a previous line.

3. The apparatus of claim 2, wherein the line data includes: color data indicating color information of the respective pixel data included in the line; alpha information to be alpha blended with respect to the color data; or mode information that contains information on a display device in which the respective pixel data are displayed.

4. An apparatus including at least one processing device for generating graphic data with plural graphic layers, comprising:
   a line information extractor, using the at least one processing device, extracting line information comprising control information on each line of a plurality of lines constituting the graphic data generated by combining plural graphic layers;
   a line data extractor receiving all of the layers to be combined to generate the graphic data and input alpha information to be alpha blended with the layers and graphic data, and extracting line data for the graphic data from the received input alpha information and all of the layers, the line data comprising pixel data included in each line of the plurality of lines constituting the graphic data;
   a line information and line data combiner to generate the graphic data by combining the extracted line information, comprising the control information on each line of the plurality of lines, and the extracted line data, comprising the pixel data included in each line of the plurality of lines and respective information indicating a display device, of plural display devices, on which respective pixel data, of plural pixel data of the graphic data, are configured to be displayed; and
   a run-length encoder run-length encoding with respect to the line data based on a determination that information indicates that run-length encoding is to be performed,
   wherein the line information includes: information on whether an OSD exists, which indicates whether OSD data exists in a respective line; the information on whether the run-length encoding is to be performed, which indicates whether run-length encoding with respect to the line data is to be performed; information on whether a bitmap is used, which indicates whether a bitmap table is to be used in order to display color information of each pixel of the respective line; or information on whether the respective line is the same as an upper line, which indicates whether the respective line is identical to a previous line.

5. The apparatus of claim 4, wherein the line data includes: color data indicating color information of the respective pixel data included in the line; alpha information to be alpha blended with respect to the color data; or mode information that contains information on a display device in which the respective pixel data are displayed.

6. The apparatus of claim 5, wherein the run-length encoder run-length encodes a combined value of the alpha information and the mode information, and run-length encodes the color data.

7. An apparatus including at least one processing device for generating graphic data, comprising:
   a line information extractor, using the at least one processing device, extracting line information of each line of the graphic data, the graphic data generated by combining plural graphic layers;
   a line data extractor receiving alpha information to be alpha blended with the graphic layers and the graphic data, and extracting line data from the graphic data; and
   a line information and line data combiner combining the extracted line information and line data,
   wherein the line information includes information on whether a run-length encoding is to be performed, which indicates whether run-length encoding with respect to the line data is to be performed, and wherein the line information further includes: information on whether an OSD exists, which indicates whether OSD data exists in the line; information on whether a bitmap is used, which indicates whether a bitmap table is to be used in order to display color information of each pixel of the line; or information on whether the line is the same as an upper line, which indicates whether the line is identical to a previous line, and
   wherein the apparatus further comprises a run-length encoder run-length encoding with respect to the line data based on a determination that the information indicates that the run-length encoding is to be performed.

8. The apparatus of claim 7, wherein the line data includes: color data indicating color information of the respective pixel data included in the line;
   alpha information to be alpha blended with respect to the color data; or mode information that contains information on a display device in which the respective pixel data are displayed.

9. The apparatus of claim 8, wherein the run-length encoder run-length encodes a combined value of the alpha information and the mode information, and run-length encodes the color data.

10. A run-length encoder including at least one processing device, comprising:
    a first run-length encoder, using the at least one processing device, run-length encoding a combination of respective alpha information to be alpha blended with respective pixel data of plural graphic layers, and separate respective information for each of select pixel data, of the respective pixel data, indicating a display device, of plural display devices, on which each select pixel data is configured to be displayed; and
    a second run-length encoder run-length encoding color information of the respective pixel data,
    wherein each of plural pixel data of the respective pixel data represents a combination of pixel data from the plural graphic layers in a combined graphic layer, with each of the plural graphic layers and the combined graphic layer including pixel data representing one or more particular graphic data or OSD data.

11. A method of generating graphic data with plural graphic layers, comprising:
    extracting, using at least one processing device, line information comprising control information on each line of a plurality of lines of a combined graphic layer constituting the graphic data, generated by combining plural graphic layers into the combined graphic layer;
    receiving all of the layers to be combined to generate the graphic data and input alpha information to be alpha blended with the layers and graphic data, and extracting line data for the graphic data from the received input alpha information and all of the layers, the line data comprising pixel data included in each line of the plurality of lines of the combined graphic layer constituting the graphic data; and
    generating the graphic data by combining the extracted line information, comprising the control information on each line of the plurality of lines, and the extracted line data, comprising the pixel data included in each of the plurality of lines and separate respective information for each of select pixel data, of pixel data included in the plurality of lines, indicating a display device, of plural display devices, on which each of the select pixel data, is configured to be displayed.

12. The method of claim 11, wherein the line information includes: information on whether an OSD exists, which indicates whether OSD data exists in a respective line; information on whether a run-length encoding is to be performed, which indicates whether run-length encoding with respect to the line data is to be performed; information on whether a bitmap is used, which indicates whether a bitmap table is to be used in order to display color information of each pixel of the respective line; or information on whether the respective line is the same as an upper line, which indicates whether the respective line is identical to a previous line.

13. The method of claim 12, wherein the line data includes at least one of color data indicating color information of the respective pixel data included in the line, alpha information to be alpha blended with respect to the color data, and mode information that contains information on a display device in which the respective pixel data are displayed.

14. A method of generating graphic data with plural graphic layers, comprising:
  extracting, using at least one processing device, line information comprising control information on each line of a plurality of lines constituting the graphic data generated by combining plural graphic layers;
  receiving all of the layers to be combined to generate the graphic data and input alpha information to be alpha blended with the layers and graphic data, and extracting line data for the graphic data from the received input alpha information and all of the layers, the line data comprising pixel data included in each line of the plurality of lines constituting the graphic data;
  generating the graphic data by combining the extracted line information, comprising the control information on each line of the plurality of lines, and the extracted line data, comprising the pixel data included in each of the plurality of lines and respective information indicating a display device, of plural display devices, on which respective pixel data, of plural pixel data of the graphic data, are configured to be displayed; and
  run-length encoding with respect to the line data based on a determination that information indicates that a run-length encoding is to be performed,
  wherein the line information includes: information on whether an OSD exists, which indicates whether OSD data exists in a respective line; the information on whether the run-length encoding is to be performed, which indicates whether run-length encoding with respect to the line data is to be performed; information on whether a bitmap is used, which indicates whether a bitmap table is to be used in order to display color information of each pixel of the respective line; or information on whether the respective line is the same as an upper line, which indicates whether the respective line is identical to a previous line.

15. The method of claim 14, wherein the line data includes at least one of color data indicating color information of the respective pixel data included in the line, alpha information to be alpha blended with respect to the color data, and mode information that contains information on a display device in which the respective pixel data are displayed.

16. The method of claim 15, further comprising:
  run-length encoding a combined value of the alpha information and the mode information; and
  run-length encoding the color data.

17. A method of generating graphic data, comprising:
  extracting, using at least one processing device, information on each line from graphic data generated by combining plural graphic layers;
  receiving alpha information to be alpha blended with the graphic layers and the graphic data, and extracting each line data from the graphic data; and
  combining the extracted line information and line data,
  wherein the line information includes information on whether a run-length encoding is to be performed, which indicates whether run-length encoding with respect to the line data is to be performed, and wherein the line information further includes: information on whether an OSD exists, which indicates whether OSD data exists in the line; information on whether a bitmap is used, which indicates whether a bitmap table is to be used in order to display color information of each pixel of the line; or information on whether the line is the same as an upper line, which indicates whether the line is identical to a previous line, and
  wherein the method further comprises run-length encoding with respect to the line data based on a determination that the information indicates that the run-length encoding is to be performed.

18. The method of claim 17, wherein the line data includes at least one of color data indicating color information of the respective pixel data included in the line, alpha information to be alpha blended with respect to the color data, and mode information that contains information on a display device in which the respective pixel data are displayed.

19. The method of claim 18, further comprising:
  run-length encoding a combined value of the alpha information and the mode information; and
  run-length encoding the color data.

20. A method of generating graphic data, comprising:
  run-length encoding, using at least one processing device, a combination of respective alpha information to be alpha blended with respective pixel data of plural graphic layers, and separate respective information for each of select pixel data, of the respective pixel data, indicating a display device, of plural display devices, on which each select pixel data is configured to be displayed; and
  run-length encoding color information on the respective pixel data,
  wherein each of plural data of the respective pixel data represents a combination of pixel data from the plural graphic layers in a combined graphic layer, with each of the plural graphic layers and the combined graphic layer including pixel data representing one or more particular graphic data or OSD data.

21. A method of generating graphic/control integrated data, comprising:
  extracting, using at least one processing device, line information from graphic data of the graphic/control integrated data, the graphic data having plural combined graphic layers;
  extracting line data from the graphic data;
  determining whether the extracted line information indicates that run-length encoding is to be performed;
  run-length encoding the extracted line data based on the determination that the extracted line information indicates that the run-length encoding is to be performed, the run-length encoding including run-length encoding a combination of alpha information to be blended with the graphic data and display device information regarding a device in which pixel data are to be displayed, and separately run-length encoding color information of the pixel data; and combining the extracted line information and the encoded line data based on the determination that the extracted line information indicates that the run-length encoding is to be performed.

22. An apparatus including at least one processing device for generating combined graphic data with plural graphic layers, comprising:

a line information extractor, using the at least one processing device, extracting line information comprising control information on each line of a plurality of lines of a combined graphic layer, generated by combining the plural graphic layers into the combined graphic layer, with each of the plural graphic layers and the combined graphic layer including plural pixel data representing one or more particular graphic data or OSD data;

a line data extractor receiving respective pixel data of all of the plural graphic layers and respective alpha information to be alpha blended with the plural graphic respective pixel data, and extracting line data for the combined graphic data from the received respective alpha information and the respective pixel data of each of the plural graphic layers, the extracted line data comprising pixel data included in each line of the plurality of lines of the combined graphic layer; and a line information and line data combiner to generate the combined graphic data by combining the extracted line information, comprising the control information on each line of the plurality of lines of the combined graphic layer, and the extracted line data, comprising the pixel data included in each line of the plurality of lines of the combined graphic layer and respective information indicating a display device, of plural display devices, on which respective pixel data, of plural pixel data of the combined graphic data, are configured to be displayed.

23. The apparatus of claim 22, wherein the line information includes: information on whether an OSD exists, which indicates whether OSD data exists in a respective line; information on whether a run-length encoding is to be performed, which indicates whether run-length encoding with respect to the line data is to be performed; information on whether a bitmap is used, which indicates whether a bitmap table is to be used in order to display color information of each pixel of the respective line; or information on whether the respective line is the same as an upper line, which indicates whether the respective line is identical to a previous line.

24. The apparatus of claim 23, wherein the line data includes: color data indicating color information of the respective pixel data included in the line; alpha information to be alpha blended with respect to the color data; or mode information that contains information on a display device in which the respective pixel data are displayed.

25. A method of generating combined graphic data from plural graphic layers, comprising:

extracting, using at least one processing device, line information comprising control information on each line of a plurality of lines of a combined graphic layer, generated by combining the plural graphic layers into the combined graphic layer, with each of the plural graphic layers and the combined graphic layer including plural pixel data representing one or more particular graphic data or OSD data;

receiving respective pixel data of all of the plural graphic layers and respective alpha information to be alpha blended with the respective pixel data, and extracting line data for the combined graphic data from the received respective alpha information and the respective pixel data, the extracted line data comprising pixel data included in each line of the plurality of lines of the combined graphic layer; and generating the combined graphic data by combining the extracted line information, comprising the control information on each line of the plurality of lines of the combined graphic layer, and the extracted line data, comprising the pixel data included in each of the plurality of lines of the combined graphic layer and respective information indicating a display device, of plural display devices, on which respective pixel data, of plural pixel data of the combined graphic data, are configured to be displayed.

26. The method of claim 25, wherein the line information includes: information on whether an OSD exists, which indicates whether OSD data exists in a respective line; information on whether a run-length encoding is to be performed, which indicates whether run-length encoding with respect to the line data is to be performed; information on whether a bitmap is used, which indicates whether a bitmap table is to be used in order to display color information of each pixel of the respective line; or information on whether the respective line is the same as an upper line, which indicates whether the respective line is identical to a previous line.

27. The method of claim 26, wherein the line data includes at least one of color data indicating color information of the respective pixel data included in the line, alpha information to be alpha blended with respect to the color data, and mode information that contains information on a display device in which the respective pixel data are displayed.

* * * * *